United States Patent
Kambara

(10) Patent No.: US 10,654,402 B2
(45) Date of Patent: May 19, 2020

(54) LIGHTING CONTROL DEVICE, LIGHTING CONTROL METHOD AND LIGHTING TOOL FOR VEHICLE

(71) Applicant: STANLEY ELECTRIC CO., LTD., Tokyo (JP)

(72) Inventor: Takeshi Kambara, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/254,141

(22) Filed: Jan. 22, 2019

(65) Prior Publication Data
US 2019/0225139 A1 Jul. 25, 2019

(30) Foreign Application Priority Data
Jan. 24, 2018 (JP) ................................. 2018-009301

(51) Int. Cl.
*B60Q 1/14* (2006.01)

(52) U.S. Cl.
CPC ........... *B60Q 1/1423* (2013.01); *B60Q 1/143* (2013.01); *B60Q 2300/056* (2013.01); *B60Q 2300/43* (2013.01)

(58) Field of Classification Search
CPC ........ B60Q 1/1423; B60Q 1/04; B60Q 1/143; B60Q 2300/23; B60Q 2300/41; B60Q 2300/42; B60Q 2300/331; B60Q 1/0023; B60Q 1/1461; B60Q 2300/43; A61B 5/6893; A61B 5/18; G06K 9/00604; H05B 37/02
See application file for complete search history.

(56) References Cited

U.S. PATENT DOCUMENTS

| | | | |
|---|---|---|---|
| 9,103,521 B2* | 8/2015 | Nishitani | F21V 23/007 |
| 9,260,051 B2* | 2/2016 | Ehlgen | B60Q 1/115 |
| 9,701,237 B2* | 7/2017 | Hiratsuka | B60Q 1/085 |
| 9,738,214 B2* | 8/2017 | Nakatani | F21S 41/143 |
| 10,059,252 B2* | 8/2018 | Mizuno | F21S 41/141 |
| 10,293,749 B2* | 5/2019 | Saito | B60Q 1/04 |
| 2016/0152174 A1* | 6/2016 | Hagisato | B60Q 1/143 362/466 |
| 2019/0077305 A1* | 3/2019 | Kita | A61B 5/6893 |

FOREIGN PATENT DOCUMENTS

| | | |
|---|---|---|
| DE | 102012200040 A1 | 7/2013 |
| JP | 2017-013516 A | 1/2017 |
| WO | 2014184634 A2 | 11/2014 |

OTHER PUBLICATIONS

The extended European Search Report for the related European Patent Application No. 19153120.1 dated Jun. 28, 2019.

* cited by examiner

*Primary Examiner* — Haissa Philogene
(74) *Attorney, Agent, or Firm* — Kenealy Vaidya LLP

(57) ABSTRACT

A lighting control device configured to control a radiation state of light from a headlamp for a vehicle includes a vehicle model information acquisition section configured to acquire vehicle model information of a vehicle located in front in front of a host vehicle, a distance detection section configured to detect a distance between the vehicle located in front and the host vehicle, and a light distribution controller configured to control a light distribution with respect to a side in front of the host vehicle by the headlamp for a vehicle on the basis of the vehicle model information and the distance.

18 Claims, 9 Drawing Sheets

VEHICLE MODEL IDENTIFICATION INFORMATION

| VEHICLE MODEL INFORMATION | VEHICLE TYPE INFORMATION | VEHICLE HEIGHT H1 | DETECTION REFERENCE HEIGHT H2 |
|---|---|---|---|
| aaa | LARGE-SIZED VEHICLE | H1a | H2a |
| bbb | SMALL-SIZED VEHICLE | H1b | H2b |
| ccc | SMALL SIZED VEHICLE | H1b | H2b |
| ddd | MEDIUM-SIZED VEHICLE | H1c | H2c |
| ⋮ | ⋮ | ⋮ | ⋮ |

LIGHTING CONTROL DEVICE, LIGHTING CONTROL METHOD AND LIGHTING TOOL FOR VEHICLE

CROSS-REFERENCE TO RELATED APPLICATION

Priority is claimed on Japanese Patent Application No. 2018-009301, filed Jan. 24, 2018, the content of which is incorporated herein by reference.

BACKGROUND OF THE INVENTION

Field of the Invention

The present invention relates to a lighting control device, a lighting control method, and a lighting tool for a vehicle.

Description of Related Art

A headlight for an automobile has two functions of, for example, a traveling beam (a so-called high beam) and a passing beam (a so-called low beam).

In recent years, an adaptive driving beam (ADB) has been developed, and a lamp having a function of shielding a portion of a preceding vehicle or an oncoming vehicle present at a side in front of a vehicle from light and holding a region of a traveling beam has been proposed.

In the ADB, when a side in front of the vehicle is imaged and an object to be shielded from light is detected, a signal is sent to a light control module (LCM) and the light is shielded such that the light does not reach the object.

In a technology of calculating a range of a direction in which radiation of a headlight for a vehicle is suppressed, regardless of whether a mounting position of a sensor is a center of a vehicle or not, a technology of calculating a range of a direction in which radiation of a headlight is to be suppressed is known (for example, see Japanese Unexamined Patent Application, First Publication No. 2017-013516).

In this technology, a lamp ECU acquires a position of an object light source of a vehicle located in front when seen from a sensor attachment position from a sensor, calculates a direction after parallax correction when a target position based on the acquired object light source is seen from a lighting tool attachment position on the basis of a positional deviation amount between the lighting tool attachment position and the sensor attachment position, and outputs a light shielding range on the basis of the calculated direction after parallax correction.

SUMMARY OF THE INVENTION

It is considered to control light distribution of a headlight for a host vehicle with respect to a predetermined direction such as an upward/downward direction or the like of a vehicle located in front. In controlling light distribution of the headlight for a host vehicle with respect to a predetermined direction such as an upward/downward direction or the like of a vehicle located in front, there is a need to derive a light distribution condition with respect to the vehicle located in front.

However, in the technology disclosed in Japanese Unexamined Patent Application, First Publication No. 2017-013516, a range of a direction in which the calculated radiation of the headlight is to be suppressed is a leftward/rightward direction, and a range of a direction in which radiation of the headlight with respect to the upward/downward direction of the vehicle located in front is to be suppressed cannot be calculated.

An aspect of the present invention is directed to providing a lighting control device, a lighting control method and a lighting tool for a vehicle that are capable of controlling a light distribution pattern of a headlamp for a host vehicle with respect to a predetermined direction of a vehicle located in front.

A lighting control device of an aspect of the present invention is a lighting control device configured to control a radiation state of light from a headlamp for a vehicle, the lighting control device including a vehicle model information acquisition section configured to acquire vehicle model information of a vehicle located in front in front of a host vehicle; a distance detection section configured to detect a distance between the vehicle located in front and the host vehicle; and a light distribution controller configured to control a light distribution with respect to a side in front of the host vehicle by the headlamp for a vehicle on the basis of the vehicle model information and the distance.

In the lighting control device of the aspect of the present invention, the light distribution controller may control a light shielding range with respect to the vehicle located in front by controlling the light distribution with respect to the front side.

In the lighting control device of the aspect of the present invention, the light distribution controller may control a light shielding range of the headlamp of the host vehicle with respect to the upward/downward direction of the vehicle located in front.

In the lighting control device of the aspect of the present invention, the distance detection section may periodically detect a distance between the vehicle located in front and the host vehicle, and the light distribution controller may control the light distribution with respect to the front side on the basis of the vehicle model information and the distance that is periodically detected.

Another aspect of the present invention is a lighting control method executed by a lighting control device configured to control a radiation state of light from a headlamp for a vehicle, the method including acquiring vehicle model information of a vehicle located in front of a host vehicle; detecting a distance between the vehicle located in front and the host vehicle; and controlling a light distribution with respect to a side in front of the host vehicle by the headlamp for a vehicle on the basis of the vehicle model information and the distance.

Another aspect of the present invention is a lighting tool for a vehicle including a headlamp for a vehicle; and the above-mentioned lighting control device.

According to the aspect of the present invention, it is possible to provide a lighting control device, a lighting control method and a lighting tool for a vehicle that are capable of controlling a light distribution pattern of a headlamp for a host vehicle with respect to a predetermined direction of a vehicle located in front.

DETAILED DESCRIPTION OF THE INVENTION

Figure 1:
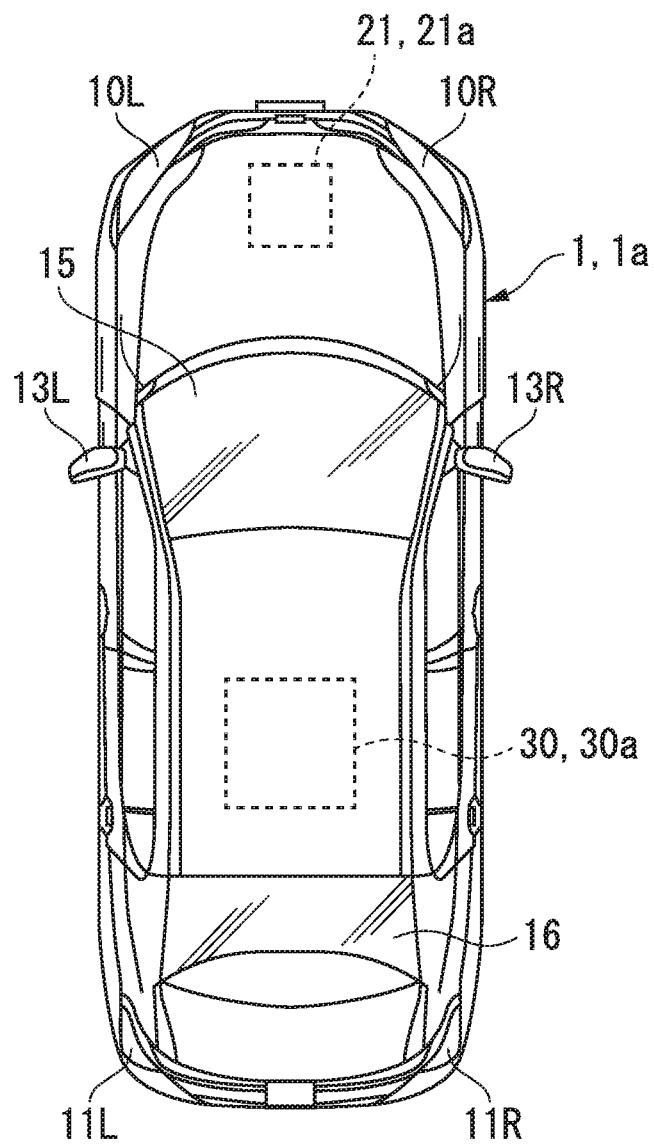
FIG. 1 is a view showing a schematic configuration of an automobile according to a first embodiment.

Next, a lighting control device, a lighting control method and a lighting tool for a vehicle according to embodiments will be described with reference to the accompanying drawings. The embodiments described below are merely exemplary, and the embodiments to which the present invention is applied are not limited to the following examples.

Further, in the drawings for describing the embodiments, the components having the same functions are designated by the same reference numerals, and overlapping description thereof will be omitted.

In addition, "on the basis of XX" disclosed herein means "on the basis of at least XX," and also includes the case on the basis of another element in addition to XX. "On the basis of XX" is not limited to the case in which XX is directly used and also includes the case on the basis of an element obtained by performing calculation or processing with respect to XX.

"XX" is an arbitrary element (for example, arbitrary information).

Hereinafter, embodiments of the present invention will be described with reference to the accompanying drawings.

First Embodiment

A lighting control device according to an embodiment is mounted in a vehicle. In the embodiment, while an automobile is shown as an example of the vehicle, a motorcycle, a bicycle, a micro-miniature mobility device, a personal mobility device, or the like, may be provided as the vehicle.

[Schematic Configuration of Automobile]

FIG. 1 is a view showing a schematic configuration of an automobile 1 according to a first embodiment.

The automobile 1 includes a headlight on a left side (in the embodiment, referred to as a left headlight section 10L), a headlight on a right side (in the embodiment, referred to as a right headlight section 10R), a tail light on a left side (in the embodiment, referred to as a left tail light section 11L), a tail light on a right side (in the embodiment, referred to as a right tail light section 11R), a sideview mirror on a left side (in the embodiment, referred to as a left sideview mirror 13L), a sideview mirror on a right side (in the embodiment, referred to as a right sideview mirror 13R), a front window 13, and a rear window 16.

The left headlight section 10L is disposed on a left side of a front side of the automobile 1, and the right headlight section 10R is disposed on a right side of the front side of the automobile 1.

The left tail light section 11L is disposed on a left side of a rear side of the automobile 1, and the right tail light section 11R is disposed on a right side of the rear side of the automobile 1.

In addition, the automobile 1 includes a vehicle outside detection section on a front side (in the embodiment, referred to as a vehicle front outside detection section 21), and a lighting control device 30.

Here, in the embodiment, while a part of a configuration section of the automobile 1 is shown, for example, in addition thereto, an arbitrary configuration section such as another configuration section or the like conventionally provided in a general automobile may be provided.

In addition, the vehicle front outside detecting section 21 and a part of or the entire lighting control device 30 are unseen in an appearance of the automobile 1 and may be provided in the automobile 1.

In addition, a vehicle detection (an imaging processing) section may be provided in the vehicle front outside detection section 21.

Figure 2:
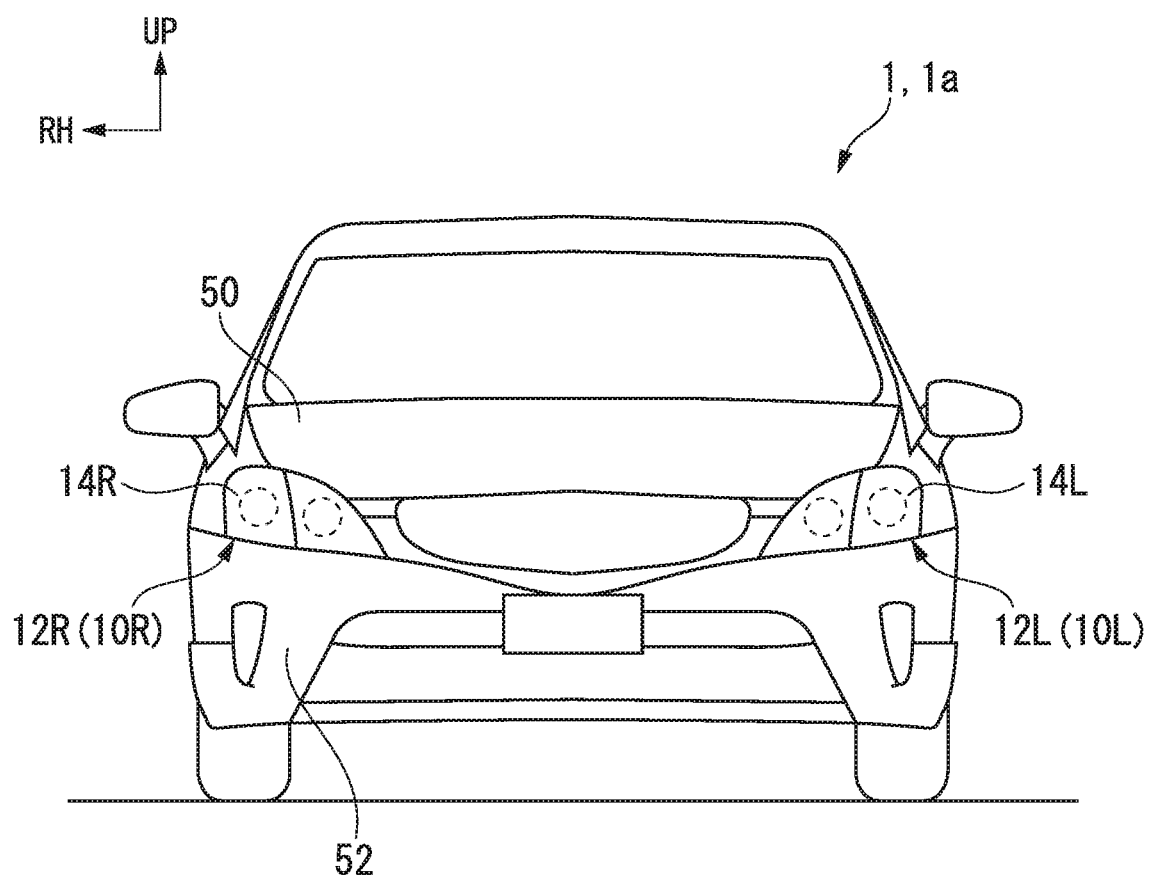
FIG. 2 is a view showing a front portion of the automobile to which a lighting system according to the first embodiment is applied.

FIG. 2 is a view showing a front portion of the automobile 1 to which a lighting system 100 according to the first embodiment is applied.

As shown in FIG. 2, the left headlight section 10L includes a headlight unit 12L on a left side. The headlight unit 12L on a left side is disposed on a left end portion of a front end portion of the automobile 1.

In addition, the right headlight section 10R includes a headlight unit 12R on a right side. The headlight unit 12R on a right side is disposed on a right end portion of a front end portion of the automobile 1.

In addition, a front end portion of a hood 50 configured to open and close an engine compartment of the automobile 1 is disposed above the headlight unit 12R on a right side and the headlight unit 12L on a left side. Then, the headlight unit 12R on a right side and the headlight unit 12L on a left side are configured to be laterally symmetrical in a vehicle width direction.

The headlight unit 12L on a left side includes a left headlight 14L that constitutes an outer portion of the headlight unit 12L on a left side in the vehicle width direction.

The headlight unit 12R on a right side includes a right headlight 14R that constitutes an outer portion of the headlight unit 12R on a right side in the vehicle width direction.

The left headlight 14L and the right headlight 14R have light sources (not shown), and illuminate a side in front of the automobile 1 with light using the light sources. The light sources are constituted by light sources for a high beam.

Alternatively, the light source may be constituted by light sources for a low beam and a high beam. That is, the left headlight 14L and the right headlight 14R are configured to be switchable to any one of a low beam that illuminates a road surface region (a low beam light distribution area) in front of the automobile 1 as a major beam, and a high beam that illuminates a region (a high beam light distribution area)

above the region irradiated with the low beam. Further, light emitting diodes (LEDs), halogen lamps, discharge lamps, lasers, or the like, are used as light sources of the left headlight 14L and the right headlight 14R.

[Schematic Functional Configuration of Lighting System 100]

Figure 3:
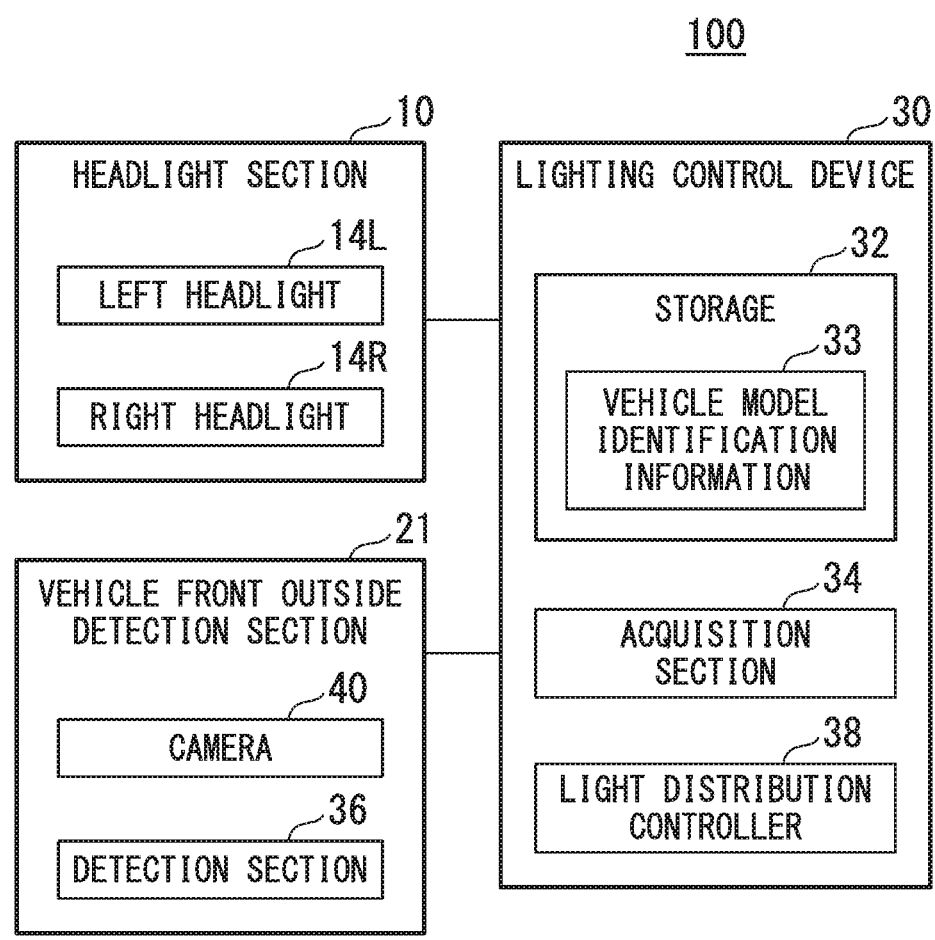
FIG. 3 is a functional block diagram showing a schematic functional configuration of the lighting system provided in the automobile according to the first embodiment.

FIG. 3 is a functional block diagram showing a schematic functional configuration of the lighting system 100 provided in the automobile 1 according to the first embodiment.

The lighting system 100 includes the headlight section 10, the lighting control device 30 and the vehicle front outside detection section 21. In addition, a lighting tool for a vehicle is constituted by the headlight section 10 and the lighting control device 30.

Here, in the embodiment, like concepts of general "front and rear," a direction in which the automobile 1 advances (travels) normally in a direction in which a driver in the automobile 1 normally faces is referred to as "front (forward)" and a direction opposite thereto is referred to as "rear (rearward)." In addition, a direction from a ground plane of a tire to a roof of the automobile 1 is referred to as upper (upward direction)" and a direction opposite thereto is referred to as "lower (downward direction)."

The headlight section 10 is a so-called headlamp, which radiates light to a side in front of the automobile 1.

The left headlight 14L mainly radiates light to a left side in front of the automobile 1. The left headlight 14L has a function of radiating light of a traveling beam (a so-called high beam) and a function of radiating light of a passing beam (a so-called low beam), and these two functions can be switched. The left headlight 14L performs control of light distribution with respect to a front side on the basis of the information output from the lighting control device 30.

In the embodiment, as an example of control of light distribution with respect to a front side, the case in which light shielding control of the headlight section 10 of the automobile 1 with respect to an upward/downward direction of a vehicle located in front is performed will be continuously described. Here, the preceding vehicle includes a preceding vehicle that is an automobile traveling in front of the automobile 1 in the same direction, and an oncoming vehicle that is an automobile traveling toward the automobile 1 in a direction opposite to the vehicle located in front. In this case, the left headlight 14L performs light shielding control on the basis of the information showing the light shielding condition output from the lighting control device 30.

The right headlight 14R mainly radiates light to a right side of a front side of the automobile 1. The right headlight 14R has a function of radiating light of a traveling beam (a so-called high beam) and a function of radiating light of a passing beam (a so-called low beam), and these two functions may be switched. The right headlight 14R performs light distribution control with respect to a front side on the basis of the information output from the lighting control device 30.

In the embodiment, as an example of light distribution control with respect to a front side, the case in which light shielding control of the headlight section 10 of the automobile 1 with respect to the upward/downward direction of the vehicle located in front is performed will be continuously described. In this case, the right headlight 14R performs light shielding control on the basis of the information showing the light shielding condition output from the lighting control device 30.

Further, the arbitrary headlamps may be used as the left headlight 14L and the right headlight 14R, respectively.

As a specific example, for example, one or more of a lamp of a traveling beam, a micro electro mechanical systems (MEMS) laser scanning headlamp, a digital mirror device (DMD) headlamp, a matrix ADB headlamp configured to control rows and columns, an ADB headlamp configured to control columns only, and so on, may be used as the lighting lamps.

Here, for example, the MEMS laser scanning headlamp is an example of a headlamp for a vehicle capable of variably changing a light distribution and an example of a seamless ADB lamp.

The vehicle front outside detection section 21 detects information related to an outer side of a front side of the automobile 1. In the embodiment, while the automobile 1 includes the vehicle front outside detection section 21, a vehicle rear outside detection section may be provided as another configuration example.

In addition, the automobile 1 may include a vehicle outside detection section (in the embodiment, also referred to as "a vehicle lateral outside detection section") configured to detect information related to a lateral outer side of the automobile 1 as another configuration example. As the vehicle lateral outside detection section, for example, a vehicle right outside detection section with respect to a direction of travel of the automobile 1 and a vehicle left outside detection section with respect to a direction of travel of the automobile 1 may be used.

The vehicle front outside detection section 21 may include a detection section configured to detect arbitrary information related to a front outside of the vehicle. The vehicle front outside detection section 21 may include one or more of, for example, a camera (an imaging device) 40, a light detection and ranging (LiDAR), radar, sonar, and so on. In the embodiment, as an example, the case in which the vehicle front outside detection section 21 includes the camera 40 will be continuously described.

The vehicle front outside detection section 21 includes the camera 40 and a detection section 36. Further, while the detection section 36 is included in the vehicle front outside detection section 21 in the embodiment, the detection section 36 may be provided in the lighting control device 30.

For example, the camera 40 may include a function of detecting visible light, may include a function of detecting infrared light, or may include both of them. In the embodiment, the case in which the camera 40 includes a function of detecting visible light will be continuously described. The camera 40 is attached to a predetermined position (for example, in the vicinity of an interior rearview mirror) of the automobile 1, and captures a space in front of the automobile 1.

The detection section 36 derives a front vehicle-reference point distance (a distance between reference points) that is a distance between a reference point of the automobile 1 and a detection reference position of the vehicle 2 located in front on the basis of an image in front of the automobile 1 periodically captured by the camera 40 when information showing the vehicle 2 located in front has been detected output from an acquisition section 34 of the lighting control device 30 is acquired, which will be described below. Here, an example of the reference point of the automobile 1 is a position to which the camera 40 is attached (for example, in the vicinity of the interior rearview mirror).

The detection section 36 corrects the derived reference points by adding or subtracting a variation of a distance between the vehicle 2 located in front and the automobile 1 generated in a time while information showing a light shielding range from the lighting control device 30 to the headlight section 10 is output after an image in front of the automobile 1 is output from the camera 40 to the lighting control device 30 to/from the derived distance between the reference points, and derives a distance L between reference points after correction that is a distance between the corrected reference points.

Specifically, the detection section 36 derives the distance L between the reference points after correction by adding a variation of the distance between the vehicle 2 located in front and the automobile 1 to a distance between the derived reference points when the vehicle 2 located in front is a preceding vehicle that travels at a higher speed that that of the automobile 1. In addition, the detection section 36 derives the distance L between the reference points after correction by subtracting a variation of a distance between the vehicle 2 located in front and the automobile 1 from the distance between the derived reference points when the vehicle 2 located in front is a preceding vehicle that travels at a lower speed that that of the automobile 1 and when the vehicle 2 located in front is an oncoming vehicle. Here, a variation of the distance between the vehicle 2 located in front and the automobile 1 is previously derived. A value of the variation can be obtained by, for example, calculating a variation value of distances per unit time of the vehicle 2 located in front and the host vehicle 1 from measurement data of distance between vehicles in the past, and multiplying a time consumed for outputting information showing the light shielding range from the image output and the variation value. In addition, if speed information of the vehicle 2 located in front is available through another method (infrared communication or the like), a variation value may be calculated by integrating a speed difference with the host vehicle 1 while the information showing the light shielding range is output from the image output.

Figure 4:
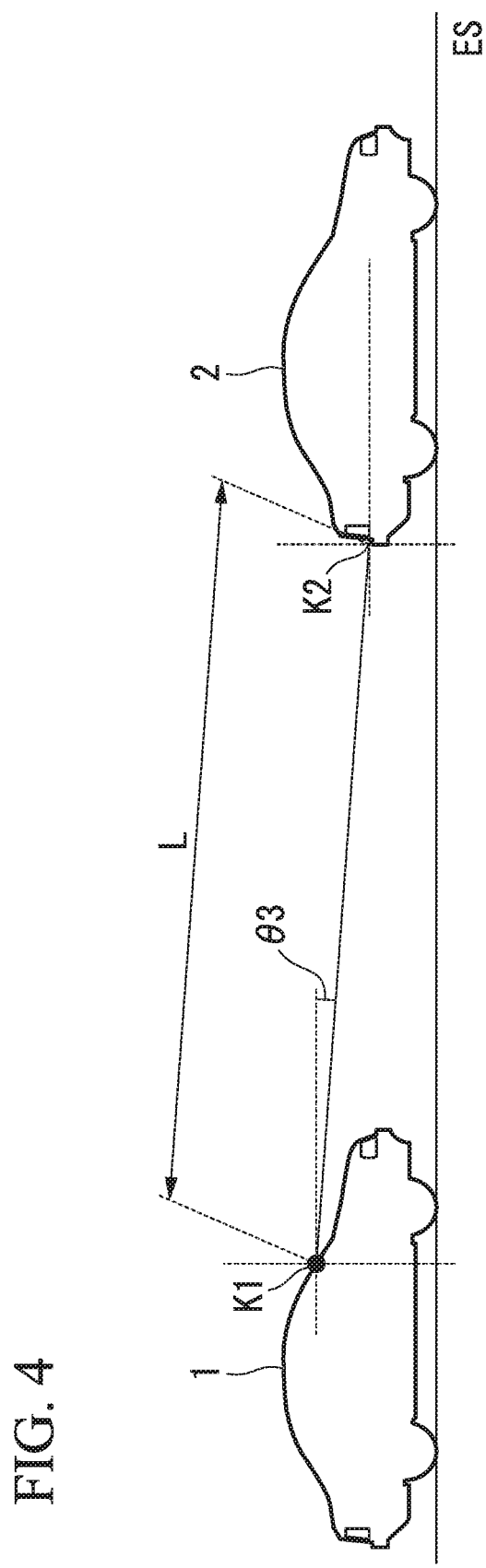
FIG. 4 is a view showing an example of a distance between reference points after correction between a vehicle located in front and an automobile.

FIG. 4 is a view showing an example of the distance L between the reference points after correction between the vehicle 2 located in front and the automobile 1. In FIG. 4, while the case in which the vehicle 2 located in front is a preceding vehicle is shown as an example, the example may also be applied to the case in which the vehicle 2 located in front is an oncoming vehicle. In the example shown in FIG. 4, as an example of the distance L between the reference points after correction, a distance between a reference point K of the automobile 1 and a detection reference position K2 of the vehicle 2 located in front is shown.

In FIG. 4, θ3 is an angle formed by a line obtained by horizontally extending the reference point K1 of the automobile 1 with respect to a ground surface ES and a line that connects the reference point K1 of the automobile 1 and the detection reference position K2 of the vehicle 2 located in front. θ3 shows an angle on a lower side of light radiated from the headlight 14 of the automobile 1. Hereinafter, θ3 is referred to as "a headlight radiation lower angle." The detection section 36 derives a headlight radiation lower angle θ3. The detection section 36 outputs information showing the distance L between the derived reference points after correction and information showing the headlight radiation lower angle θ3 to a light distribution controller 38 of the lighting control device 30 (to be described below). Further, θ3 clockwise from a horizontal line in FIG. 4 is treated as a negative angle. Returning to FIG. 3, the description will be continued.

The lighting control device 30 includes a storage 32, the acquisition section 34 and the light distribution controller 38.

The storage 32 stores information. Here, the storage 32 may store arbitrary information. As an example, the storage 32 may store information such as a control program executed by the lighting control device 30, a control parameter, or the like. In this case, the lighting control device 30 includes a processor such as a central processing unit (CPU) or the like, and the processor executes various control programs stored in the storage 32 using the control parameter stored in the storage 32 to execute various types of processing. In addition, the storage 32 stores vehicle model identification information 33.

(Vehicle Model Identification Information)

Figures 5, 6:
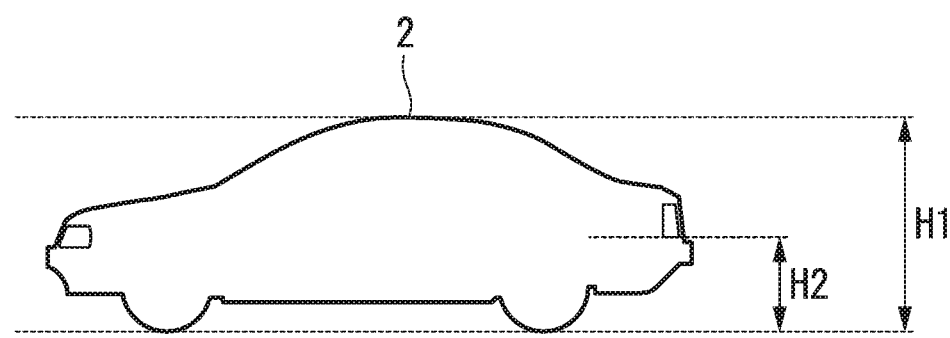
FIG. 5 is a view showing an example of vehicle model identification information stored in a storage of a lighting control device according to the first embodiment.
FIG. 6 is a view showing an example of a vehicle height and a detection reference height of a vehicle located in front.

FIG. 5 is a view showing an example of the vehicle model identification information 33 stored in the storage 32 of the lighting control device 30 according to the first embodiment.

The vehicle model identification information 33 is information obtained by associating vehicle model information, vehicle type information, a vehicle height H1 and a detection reference height H2. In the example shown in FIG. 5, the vehicle model information "aaa," the vehicle type information "large-sized car," the vehicle height H1 "H1a" and the detection reference height H2 "H2a" are associated.

The vehicle model information is information showing a vehicle model of a vehicle located in front acquired by the acquisition section 34 (to be described below). The vehicle type information is information showing which of categories of automobiles such as a large-sized car, a medium-sized car, a small-sized car, or the like, corresponds to the vehicle model shown by the vehicle model information.

FIG. 6 is a view showing an example of the vehicle height H1 and the detection reference height H2 of the vehicle 2 located in front. In FIG. 6, while the case in which the vehicle 2 located in front is a preceding vehicle is shown as an example, the example may also be applied to the case in which the vehicle 2 located in front is an oncoming vehicle.

The vehicle height H1 is a height of the vehicle 2 located in front, which shows a length from a ground plane of a tire to the uppermost section such as a roof or the like. The detection reference height H2 is information showing a height of a detection reference position that is a position serving as a reference of the uppermost section or the like of a bumper of the vehicle 2 located in front when the automobile 1 detects the vehicle 2 located in front.

The detection reference position is a position serving as a reference of the vehicle 2 located in front, and a light shielding condition is derived on the basis of the detection reference position. In the embodiment, as an example of the detection reference height H2, the case in which the position is in the uppermost section of the bumper of the vehicle 2 located in front will be continuously described. For example, the detection reference height H2 is a height corresponding to half of the vehicle height H1. Specifically, when the vehicle height H1 is 1.6 meters, the detection reference height H2 is 0.8 meter. Returning to FIG. 3, the description will be continued.

The acquisition section 34 detects the vehicle 2 located in front on the basis of the image of the side in front of the automobile 1 periodically captured by the camera 40 provided in the vehicle front outside detection section 21. Specifically, the acquisition section 34 detects the vehicle 2 located in front by performing image recognition processing with respect to the image. For example, detection is performed by recognizing a pair of points of the vehicle 2 located in front. An example of the pair of points is a tail light (the left tail light section 11L, the right tail light section 11R) of a preceding vehicle when the vehicle 2 located in front is the preceding vehicle, or a headlamp (the left headlight section 10L, the right headlight section 10R) of an oncoming vehicle when the vehicle 2 located in front is the oncoming vehicle. When the vehicle 2 located in front is detected, the acquisition section 34 outputs the information showing that the vehicle 2 located in front is detected to the detection section 36 of the vehicle front outside detection section 21.

Further, the acquisition section 34 specifies a vehicle model of the vehicle 2 located in front on the basis of the information of the detected vehicle 2 located in front. Specifically, the acquisition section 34 stores the information obtained by associating the vehicle model information and a feature value of the vehicle model. The acquisition section 34 extracts a feature value of the vehicle 2 located in front from the image of the vehicle 2 located in front.

An example of the feature value is a tail light (the left tail light section 11L, the right tail light section 11R) of a preceding vehicle when the vehicle 2 located in front is the preceding vehicle, or a headlamp (the left headlight section 10L, the right headlight section 10R) of an oncoming vehicle when the vehicle 2 located in front is the oncoming vehicle.

The acquisition section 34 acquires vehicle model information associated with the feature value of the vehicle model corresponding to the extracted feature value of the vehicle 2 located in front among the feature values of the vehicle model associated with the vehicle model information by eliciting information stored in the storage 32. In addition, the acquisition section 34 acquires information showing the vehicle height H1 of the vehicle 2 located in front and information showing the detection reference height H2 on the basis of the acquired vehicle model information. The acquisition section 34 outputs the acquired information showing the vehicle height H1 and the information showing the detection reference height H2 to the light distribution controller 38. The feature value is, for example, a contour of the vehicle, and a ratio between a height and a width of the vehicle. The vehicle model corresponding to the ratio is determined as a vehicle model of the vehicle located in front. In addition, when information exchange with the vehicle located in front by infrared communication or the like is possible, for example, vehicle model information included in an infrared signal from the vehicle located in front detected by a sensor may be substituted by sending (outputting) the vehicle model information to the acquisition section 34.

Further, while the vehicle information is separately specified from the vehicle model in the above-mentioned description, when the information stored in the storage 32 is directly associated with the feature value and the vehicle type information (the large-sized car, the medium-sized car, the small-sized car, or the like), the acquisition section 34 may acquire the information showing the vehicle height H1 and the information showing the detection reference height H2 on the basis of the vehicle type information from the storage 32. Hereinafter, the information linked to the feature value regardless of a way of association with the storage 32 is vehicle model information.

The light distribution controller 38 acquires the information showing the vehicle height H1 of the vehicle 2 located in front and the information showing the detection reference height H2 output from the acquisition section 34. In addition, the light distribution controller 38 acquires the information showing the distance L between the reference points after correction and the information showing the headlight radiation lower angle θ3 output from the detection section 36.

The light distribution controller 38 derives a light shielding condition of the left headlight 14L and the right headlight 14R included in the headlight section 10 of the automobile 1 with respect to the upward/downward direction of the vehicle 2 located in front on the basis of the information showing the vehicle height H1 of the vehicle 2 located in front, the information showing the detection reference height H2, the information showing the distance L between the reference points after correction, and the information showing the headlight radiation lower angle θ3, which were acquired. The light distribution controller 38 outputs the information showing the derived light shielding condition to the headlight section 10.

Specifically, the light distribution controller 38 derives coordinates of a position of a lower limit of light (hereinafter, referred to as "a lower limit position LPC of a vehicle located in front) and coordinates of a position of an upper limit of light (hereinafter, referred to as "an upper limit position UPC of the vehicle located in front"), which are radiated from the left headlight 14L and the right headlight 14R, when the vehicle 2 located in front is seen from the reference point K1 of the automobile 1.

Figure 7:
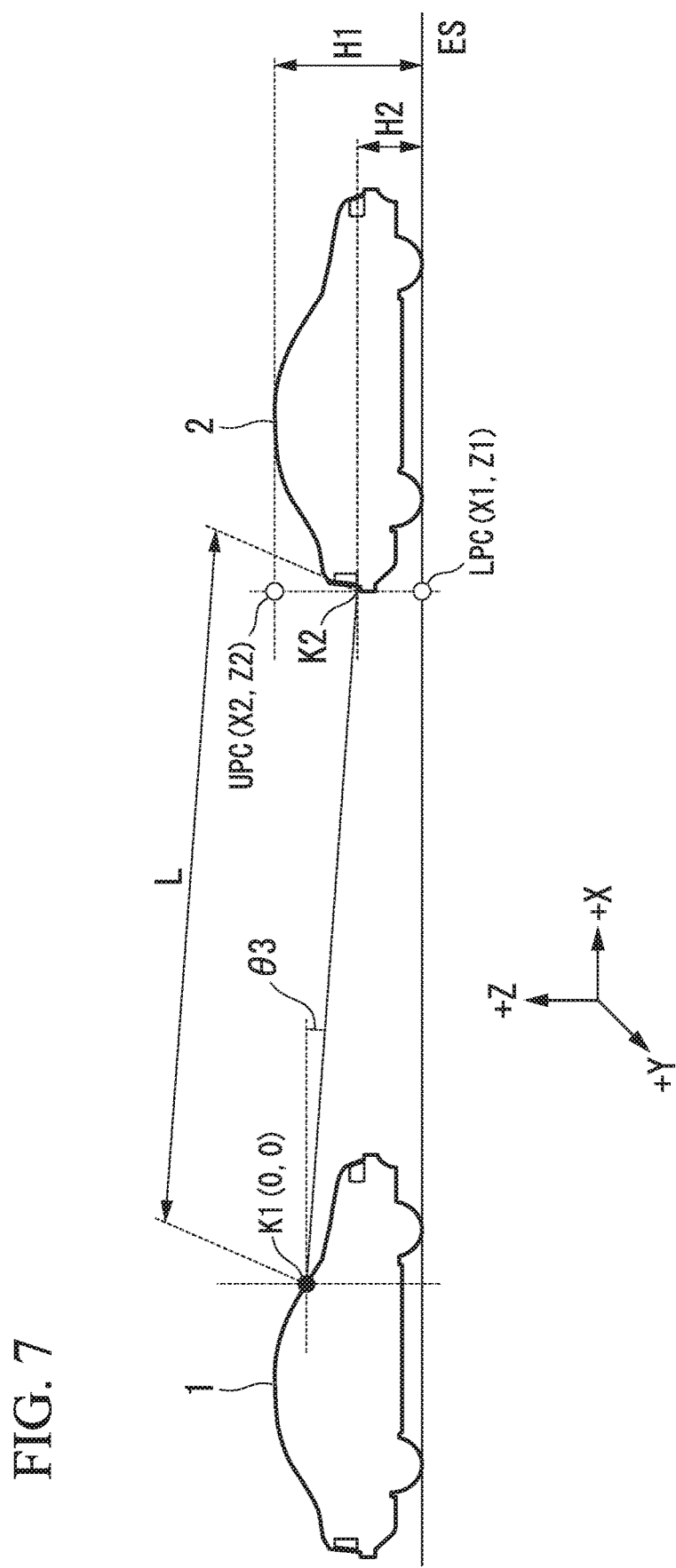
FIG. 7 is a view showing an example of processing for deriving a lower limit position of a vehicle located in front and an upper limit position of the vehicle located in front of the lighting system provided in the automobile according to the first embodiment.

FIG. 7 is a view showing an example of processing for deriving the lower limit position LPC of the vehicle located in front and the upper limit position UPC of the vehicle located in front in the lighting system 100 provided in the automobile 1 according to the first embodiment. In FIG. 7, while the case in which the vehicle 2 located in front is the preceding vehicle is shown as an example, the example may also be applied to the case in which the vehicle 2 located in front is the oncoming vehicle.

The reference point K1 of the automobile 1 is referred to as an origin (0, 0), a direction (a front (forward) direction) in which the automobile 1 advances is referred to as an X axis, a direction (an upper (upward) direction) perpendicular to the ground surface ES is referred to as a Z axis, and a direction perpendicular to the X axis and the Z axis is referred to as a Y axis. Hereinafter, the description will be continued mainly using an XZ plane constituted by the X axis and the Z axis.

The light distribution controller 38 derives the lower limit position LPC (X1, Z1) of the vehicle located in front of the light radiated from the left headlight 14L and the right headlight 14R from Equation (1) and Equation (2) when the vehicle 2 located in front is seen from the reference point K1 of the automobile 1 on the basis of the information showing the vehicle height H1 and the detection reference height H2 of the vehicle 2 located in front, the headlight radiation lower angle θ3 and the distance L between the reference points after correction. A portion of the vehicle located in front below the lower limit position LPC (X1, Z1) is shielded from the light and the portion is not irradiated with the light from the left headlight 14L and the right headlight 14R.

$$X1 = L \times \cos \theta 3 \quad (1)$$

$$Z1 = L \times \sin \theta 3 - H2 \quad (2)$$

In addition, the light distribution controller 38 derives the upper limit position UPC (X2, Z2) of the vehicle located in front of the light radiated from the headlight 14 from Equation (3) and Equation (4) when the vehicle 2 located in front is seen from the reference point K1 of the automobile 1 on the basis of the lower limit position LPC and the vehicle height H1 of the vehicle located in front, which were derived. A portion of the vehicle located in front above the upper limit position UPC (X2, Z2) is shielded from the light and the portion is not irradiated with the light from the left headlight 14L and the right headlight 14R.

$$X2 = L \times \cos \theta 3 \quad (3)$$

$$Z2 = L \times \sin\theta3 + (H1 - H2) \quad (4)$$

Next, the light distribution controller 38 derives an angle of a lower limit of the radiated light (hereinafter, referred to as "a lower edge angle of a light shielding range) αLow and an angle of an upper limit of the radiated light (hereinafter, referred to as "an upper edge angle of a light shielding range") αUp when the vehicle 2 located in front is irradiated with the light from the left headlight 14L and the right headlight 14R of the automobile 1.

Figure 8:
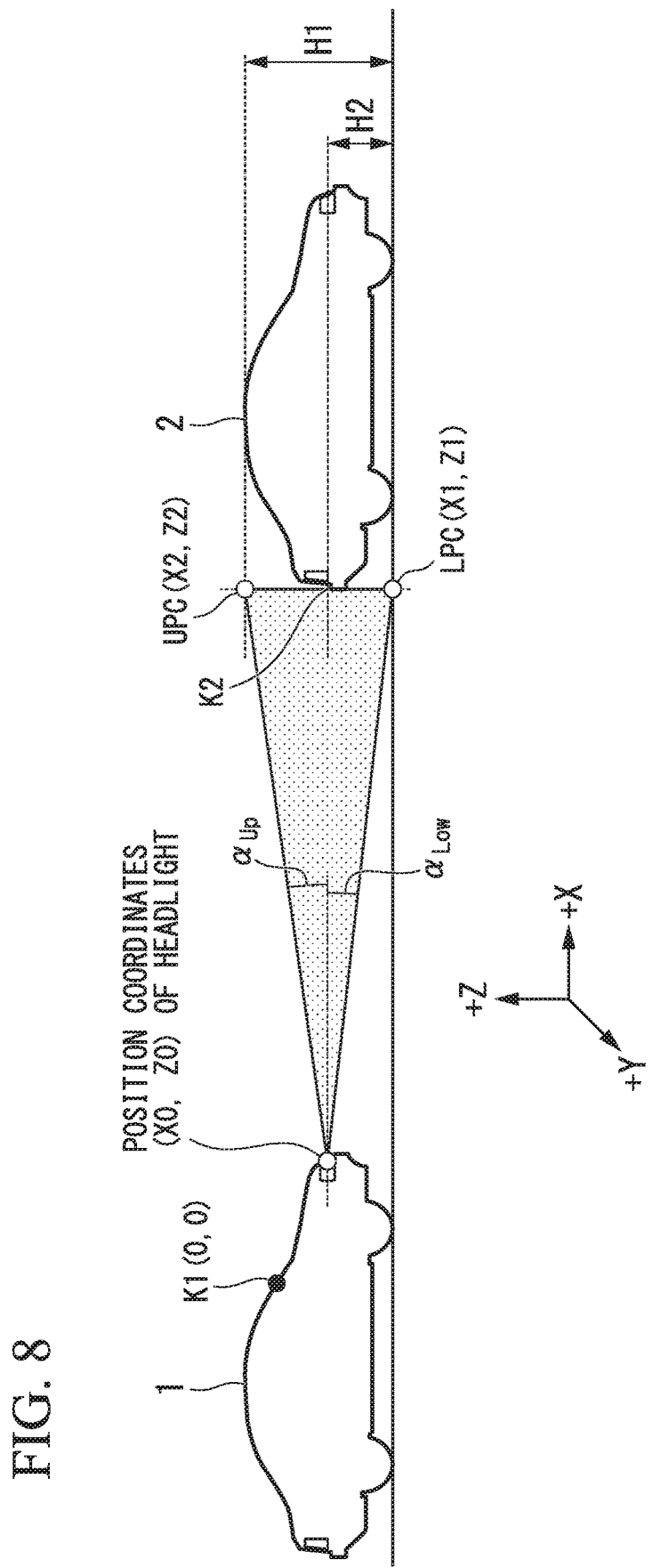
FIG. 8 is a view showing an example of processing for deriving a light shielding range lower limit angle and a light shielding range upper limit angle of the lighting system provided in the automobile according to the first embodiment.

FIG. 8 is a view showing an example of processing for deriving the lower limit angle αLow of the light shielding range and the upper limit angle αUp of the light shielding range of the lighting system 100 provided in the automobile 1 according to the first embodiment. In FIG. 8, while the case in which the vehicle 2 located in front is the preceding vehicle is shown as an example, the example may also be applied to the case in which the vehicle 2 located in front is the oncoming vehicle.

The light distribution controller 38 derives the lower edge angle αLow of the light shielding range formed between a line extending parallel to the ground surface ES from the coordinates (X0, Z0) of the position of the headlight 14 of the automobile 1 and a line that connects the coordinates (X0, Z0) of the position of the headlight 14 of the automobile 1 and the coordinates of the lower limit position LPC of the vehicle located in front of the vehicle 2 located in front from Equation (5) on the basis of the coordinates (X0, Z0) of the position of the headlight 14.

$$\alpha\text{Low} = a\tan\{(Z1-Z0)/(X1-X0)\} \quad (5)$$

In addition, the light distribution controller 38 derives the upper edge angle αUp of the light shielding range formed between a line extending parallel to the ground surface ES from the coordinates (X0, Z0) of the position of the headlight of the automobile 1 and a line that connects the coordinates (X0, Z0) of the position of the headlight 14 of the automobile 1 and the coordinates of the upper limit position UPC of the vehicle located in front of the vehicle 2 located in front from Equation (6) on the basis of the coordinates (X0, Z0) of the position of the headlight 14.

$$\alpha\text{Up} = a\tan\{(Z2-Z0)/(X2-X0)\} \quad (6)$$

The light distribution controller 38 derives the light shielding condition of the headlight 14 on the basis of the lower edge angle αLow of the light shielding range and the upper edge angle αUp of the light shielding range. The light distribution controller 38 outputs the information showing the derived light shielding condition to the headlight section 10. The left headlight 14L and the right headlight 14R provided in the headlight section 10 radiate light to a front side on the basis of the information showing the light shielding condition output from the light distribution controller 38.

(Operation of Lighting System)

Figure 9:
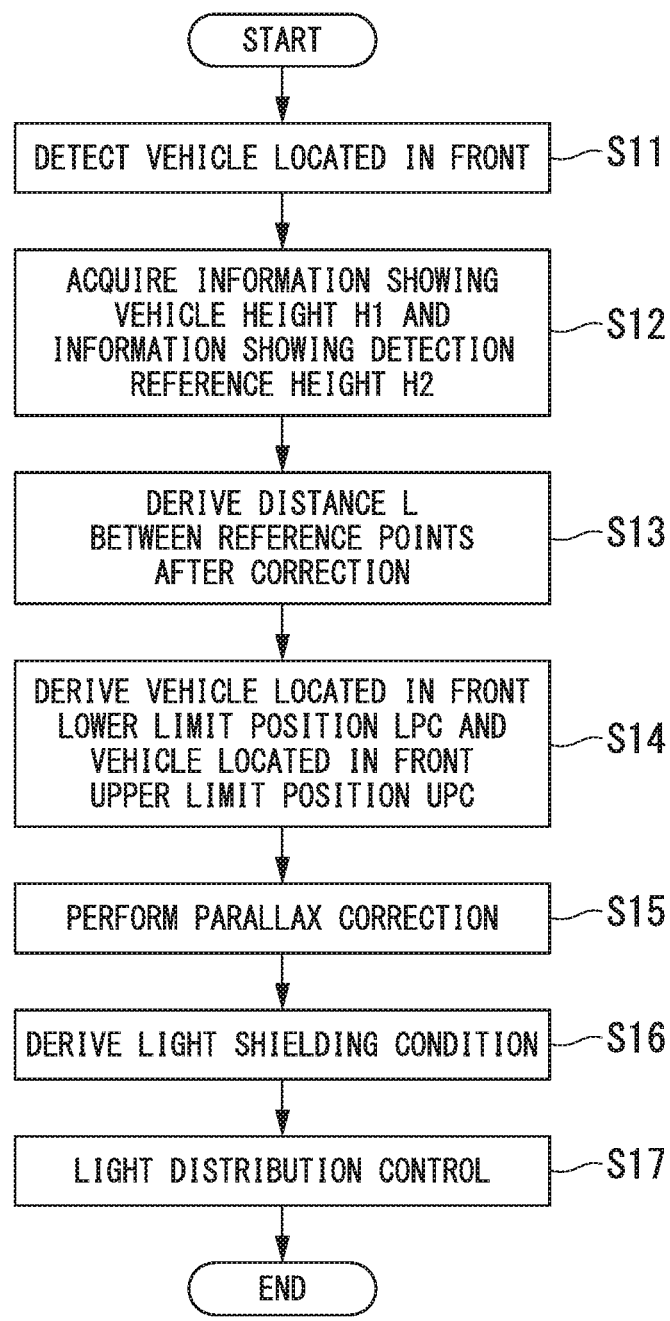
FIG. 9 is a flowchart showing an example of a procedure of processing for controlling a light shielding range of the lighting system provided in the automobile according to the first embodiment.

FIG. 9 is a flowchart showing an example of a procedure of processing for controlling a light shielding range of the lighting system 100 provided in the automobile 1 according to the first embodiment.

(Step S11)

The acquisition section 34 of the lighting control device 30 detects the vehicle 2 located in front on the basis of the image in front of the automobile 1 periodically captured by the camera 40 provided in the vehicle front outside detection section 21.

(Step S12)

The acquisition section 34 of the lighting control device 30 extracts a feature value of the vehicle 2 located in front from the image of the vehicle 2 located in front. The acquisition section 34 acquires vehicle model information associated with the feature value of the vehicle model corresponding to the extracted feature value of the vehicle 2 located in front based on the feature value of the vehicle model associated with the vehicle model information. In addition, the acquisition section 34 acquires the information showing the vehicle height H1 of the vehicle 2 located in front and the information showing the detection reference height H2 on the basis of the acquired vehicle model information and the vehicle model identification information 33 stored in the storage 32.

(Step S13)

The detection section 36 of the vehicle front outside detection section 21 derives a distance between reference points that is a distance between the reference point K1 of the automobile 1 and the detection reference position of the vehicle 2 located in front. The detection section 36 corrects the distance between the derived reference points by adding or subtracting a variation of a distance between the vehicle 2 located in front and the automobile 1 generated for a time while the information showing the light shielding range is output from the lighting control device 30 to the headlight section 10 after the image in front of the automobile 1 is output to the lighting control device 30 from the camera 40 to/from the distance, and derives the distance L between the reference points after correction that is a distance between the corrected reference points. The detection section 36 derives the headlight radiation lower angle θ3.

(Step S14)

The light distribution controller 38 of the lighting control device 30 derives the lower limit position LPC of the vehicle located in front on the basis of the information showing the vehicle height H1 and the detection reference height H2 of the vehicle 2 located in front, the headlight radiation lower angle θ3, and the distance L between the reference points after correction. In addition, the light distribution controller 38 derives the upper limit position UPC of the vehicle located in front.

(Step S15)

The light distribution controller 38 of the lighting control device 30 derives the lower edge angle αLow of the light shielding range and the upper edge angle αUp of the light shielding range, which show the light shielding range when the vehicle 2 located in front is irradiated with the light from the headlight 14 of the automobile 1, by performing parallax correction from the reference point K1 of the automobile 1 to the headlight 14 of the automobile 1.

(Step S16)

The light distribution controller 38 of the lighting control device 30 derives a light shielding condition of the headlight 14 on the basis of the lower edge angle αLow of the light shielding range and the upper edge angle αUp of the light shielding range.

(Step S17)

The light distribution controller 38 of the lighting control device 30 outputs the information showing the derived light shielding condition to the headlight section 10.

In the above-mentioned first embodiment, while the case in which the automobile 1 includes the left headlight 14L and the right headlight 14R and both of the left headlight 14L and the right headlight 14R perform light shielding control with respect to the upward/downward direction of the vehicle located in front has been described, there is no limitation thereto. For example, either the left headlight 14L or the right headlight 14R may perform light shielding control with respect to the upward/downward direction of the vehicle 2 located in front.

In the above-mentioned first embodiment, while the case in which light shielding control with respect to the left headlight 14L and the right headlight 14R with respect to the automobile 1 is performed with respect to the upward/downward direction of the vehicle 2 located in front has been described as an example of the light distribution control, there is no limitation thereto. For example, light shielding control with respect to the left headlight 14L and the right headlight 14R of the automobile 1 may be performed with respect to a leftward/rightward direction in addition to the upward/downward direction of the vehicle 2 located in front.

In the above-mentioned first embodiment, while the case in which the light distribution controller 38 of the lighting control device 30 calculates sin θ3 has been described, there is no limitation thereto. For example, a distance of the vehicle 2 located in front is sufficiently far, the headlight radiation lower angle θ3 can be approximated as θ3≈sin θ3≈tan θ3 when the angle is a small angle. In this case, it may be calculated by replacing sin θ3 with θ3.

In the above-mentioned first embodiment, while the case in which the detection section 36 derives the distance between the reference points that is the distance between the reference point of the automobile 1 and the detection reference position of the vehicle 2 located in front on the basis of the image in front of the automobile 1 periodically captured by the camera 40 has been described, there is no limitation thereto. For example, the detection section 36 may derive a distance between the reference point of the automobile 1 and a point at which a line extending from the reference point to be parallel to the ground surface reaches the vehicle 2 located in front on the basis of the image in front of the automobile 1 periodically captured by the camera 40. In this case, the detection section 36 converts the derived distance into a distance between the reference points, and performs the above-mentioned processing on the basis of the result converted into the distance between the reference points.

In the above-mentioned first embodiment, while the case in which the acquisition section 34 detects the vehicle 2 located in front by recognizing the tail light (the left tail light section 11L, the right tail light section 11R) of the preceding vehicle when the vehicle 2 located in front is the preceding vehicle and recognizing the headlamp (the left headlight section 10L, the right headlight section 10R) of the oncoming vehicle when the vehicle 2 located in front is the oncoming vehicle has been described, there is no limitation thereto. For example, the acquisition section 34 may extract structural feature points of the image such as distribution or the like of an edge that are points at which variations of concentrations in the image are abrupt by performing image recognition processing, and may detect the vehicle 2 located in front when the extracted feature point can be determined as feature points of the vehicle.

In the above-mentioned first embodiment, while the case in which the tail light (the left tail light section 11L, the right tail light section 11R) of the preceding vehicle when the vehicle 2 located in front is the preceding vehicle and the headlamp (the left headlight section 10L, the right headlight section 10R) of the oncoming vehicle when the vehicle 2 located in front is the oncoming vehicle are examples of the feature values of the vehicle 2 located in front has been described, there is no limitation thereto. For example, a vehicle height, a vehicle width, color, brightness, or the like, may be used as an example of the feature value of the vehicle 2 located in front.

In the above-mentioned first embodiment, the acquisition section 34 detects the vehicle 2 located in front on the basis of the image in front of the automobile 1 periodically captured by the camera 40 provided in the vehicle front outside detection section 21, and derives the vehicle model information on the basis of the detected feature value of the vehicle 2 located in front. Then, while the case in which the light distribution controller 38 derives the light shielding condition on the basis of the vehicle model information derived by the acquisition section 34 and light distribution control is performed on the basis of the derived light shielding condition has been described, there is no limitation thereto. For example, when the light distribution controller 38 already is performing the light distribution control, the acquisition section 34 tracks the vehicle 2 located in front that is a target of the light distribution control. During the tracking, the vehicle model condition (the vehicle height H1, the detection reference height H2, or the Z coordinate (Z1) of the lower limit position LPC of the vehicle located in front and the Z coordinate (Z2) of the upper limit position UPC of the vehicle located in front of the light radiated from the left headlight 14L and the right headlight 14R) is not varied.

Since only the distance varies as time elapses, when the distance information is continuously available and the tracking is continued, the light shielding range can be varied according to Equation (1) to Equation (6). For example, even in a situation in which the feature value cannot be detected during tracking, for example, in a situation in which one of the left tail light section 11L and the right tail light section 11R (the left and right tail lights) is hidden by a shielding object, the light shielding range according to the variation in distance can be set. Then, when the vehicle model information of the vehicle located in front detected by the acquisition section 34 is varied from the vehicle located in front that is an object of the tracking, the light distribution controller 38 may change the light shielding condition on the basis of the varied vehicle model information of the vehicle located in front.

In the above-mentioned first embodiment, while the case in which the lighting control device 30 performs the light shielding control with respect to the upward/downward direction of the vehicle located in front when the vehicle located in front is detected on the basis of the information related to an outer side of a front side of the automobile 1 has been described, there is no limitation thereto. For example, when following vehicle is detected on the basis of the information related to an outer side of a rear side of the automobile 1, the light shielding control may be performed with respect to the upward/downward direction of the following vehicle. In this case, light shielding control is performed with respect to the upward/downward direction of the following vehicle when the following vehicle is detected on the basis of the information related to an outer side of a rear side of the automobile 1 detected by the vehicle rear outside detection section.

In addition, when a lateral vehicle is detected on the basis of the information related to an outer side on a side of the automobile 1, light shielding control may be performed with respect to the upward/downward direction of the lateral vehicle. In this case, when the lateral vehicle is detected on the basis of the information related to an outer side of a side of the automobile 1 detected by the vehicle lateral outside detection section, light shielding control is performed with respect to the upward/downward direction of the lateral vehicle.

In the above-mentioned first embodiment, while the case in which the vehicle front outside detection section 21 includes the camera 40 has been described as an example, there is no limitation thereto. For example, one or more of laser radar, radar, sonar, and so on, may be further provided.

In the above-mentioned first embodiment, while the case in which the uppermost section of the bumper of the vehicle 2 located in front is provided as an example of the detection reference position has been described, there is no limitation thereto. For example, the detection reference position may be the lowermost section of the rear window of the vehicle 2 located in front or may be a central section of the bumper of the vehicle 2 located in front. In addition, the detection reference position may be different according to the vehicle type information.

In the above-mentioned first embodiment, an arbitrary method may be used for derivation of the headlight radiation lower angle θ3. Specifically, the detection section 36 may derive the headlight radiation lower angle θ3 using an association table that is previously stored in the image information of the camera. In addition, the detection section 36 may calculate the distance L between the reference points after correction in advance, and derive the headlight radiation lower angle θ3 on the basis of the calculated distance L between the reference points after correction, the height of the reference point K1 of the automobile 1 and the detection reference height H2. In this case, the detection section 36 derives the headlight radiation lower angle θ3 by calculating arc sin (a height of the reference point K1 of the automobile 1−H2)/L. In addition, when the detection section 36 has a device having an angle measurement function such as laser radar or the like, the detection section 36 may derive the headlight radiation lower angle θ3 using a result obtained through measurement by the device having the angle measurement function.

According to the lighting control device 30 of the first embodiment, the lighting control device 30 acquires vehicle model information of the vehicle 2 located in front and the automobile 1, detects a distance between the vehicle 2 located in front and the automobile 1, and controls light distribution with respect to the vehicle 2 located in front on the basis of the vehicle model information and the distance. According to the above-mentioned configuration, the lighting control device 30 can derive the light distribution condition of the vehicle 2 located in front in the upward/downward direction on the basis of the vehicle model information of the vehicle 2 located in front and the automobile 1 and the distance between the vehicle 2 located in front and the automobile 1, and it is possible to control a light distribution pattern of the headlamp of the automobile 1 with respect to the vehicle 2 located in front. Accordingly, in the lighting system 100 in which light distribution is divided in the upward/downward direction, it is possible to provide a comfortable view to a driver in the automobile 1 without giving glare to the vehicle 2 located in front.

Configuration Example

As a configuration example, there is provided a lighting control device (in the embodiment, the lighting control device 30) configured to control a radiation state of light by a headlamp for a vehicle (in the embodiment, the headlight section 10), the lighting control device including a vehicle model information acquisition section (in the embodiment, the acquisition section 34) configured to acquire vehicle model information of a vehicle located in front in front of a host vehicle, a distance detection section (in the embodiment, the detection section 36) configured to detect a distance between the vehicle located in front and the host vehicle, and a light distribution controller (in the embodiment, the light distribution controller 38) configured to control a light distribution with respect to a side in front of the host vehicle by the headlamp for a vehicle on the basis of the vehicle model information and the distance.

As a configuration example, the light distribution controller controls a light shielding range with respect to the vehicle located in front by controlling the light distribution with respect to a front side.

As a configuration example, the light distribution controller controls a light shielding range of the headlamp of the host vehicle with respect to the upward/downward direction of the vehicle located in front.

As a configuration example, the distance detection section periodically detects a distance between the front side and the host vehicle, and the light distribution controller controls a light distribution with respect to the vehicle located in front on the basis of the vehicle model information and the distance that is periodically detected.

Second Embodiment

FIG. 1 may be applied as a schematic configuration of an automobile 1a according to a second embodiment. However, the automobile 1a according to the second embodiment is distinguished from the automobile 1 according to the first embodiment in that a vehicle front outside detection section 21a is provided instead of the vehicle front outside detection section 21 and a lighting control device 30a is provided instead of the lighting control device 30.

FIG. 2 may be applied as a front portion of the automobile 1a to which a lighting system 100a according to the second embodiment is applied.

[Schematic Functional Configuration of Lighting System of Automobile]

Figure 10:
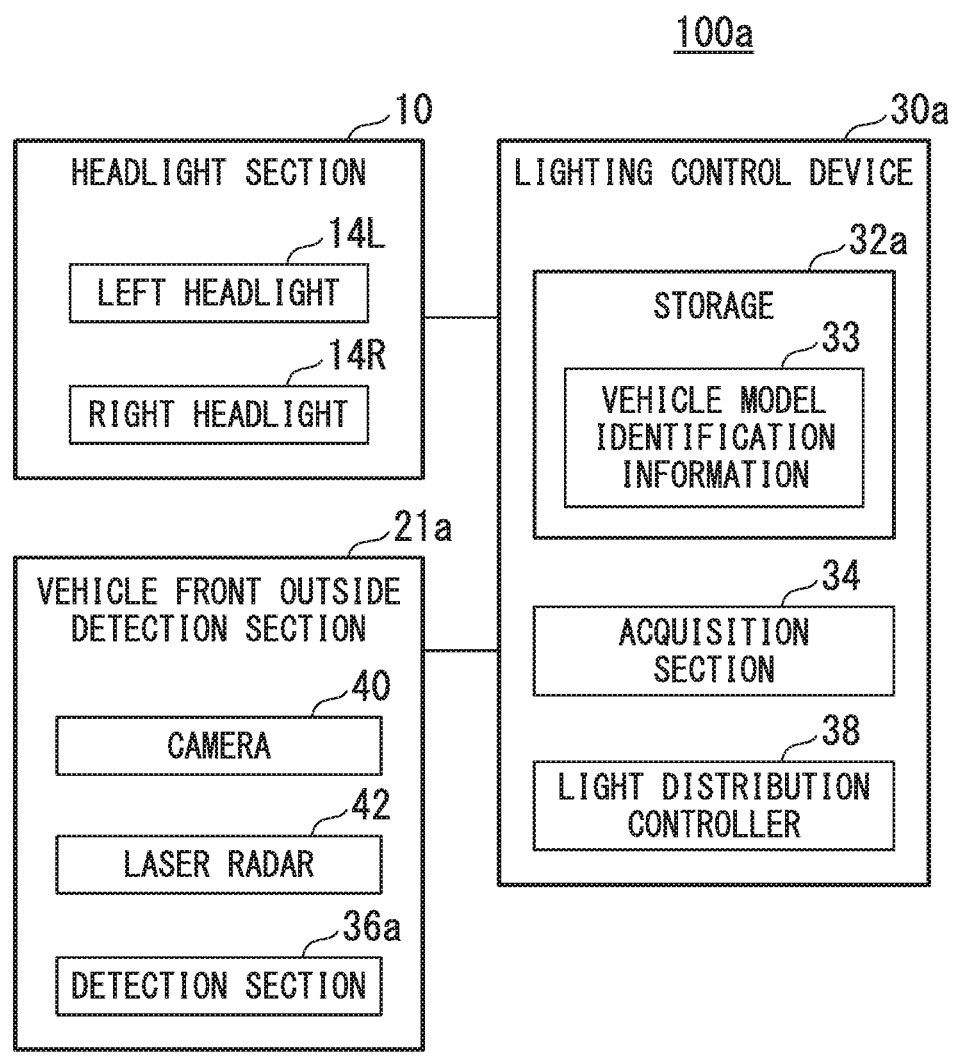
FIG. 10 is a functional block diagram showing a schematic functional configuration of a lighting system provided in an automobile according to a second embodiment.

FIG. 10 is a block diagram showing a schematic functional configuration of the lighting system 100a provided in the automobile 1a according to the second embodiment.

The lighting system 100a includes the headlight section 10, the lighting control device 30a and the vehicle front outside detection section 21a. In addition, the lighting tool for a vehicle is constituted by the headlight section 10 and the lighting control device 30a.

Here, in the embodiment, like concepts of general "front and rear," a direction in which the automobile 1a advances (travels) normally in a direction in which a driver in the automobile 1a normally faces is referred to as "front (forward)" and a direction opposite thereto is referred to as "rear (rearward)." In addition, a direction from a ground plane of a tire to a roof of the automobile 1a is referred to as upper (upward direction)" and a direction opposite thereto is referred to as "lower (downward direction)."

The vehicle front outside detection section 21a detects information related to an outer side of a front side of the automobile 1a. In the embodiment, while the automobile 1a includes the vehicle front outside detection section 21a, a vehicle rear outside detection section may be provided as another configuration example.

In addition, as another configuration example, the automobile 1a may include a vehicle outside detection section (in the embodiment, also referred to as "a vehicle lateral outside detection section") configured to detect information related to a lateral outer side of the automobile 1a. As the vehicle lateral outside detection section, for example, a vehicle right outside detection section with respect to a direction of travel of the automobile 1a and a vehicle left outside detection section with respect to a direction of travel of the automobile 1a may be used.

The vehicle front outside detection section 21a detects arbitrary information related to a front outside of the vehicle. The vehicle front outside detection section 21a may include two or more of, for example, laser radar 42, radar, sonar, a camera (an imaging device) 40, and so on. In the second embodiment, the case in which the camera 40 and the laser radar 42 are provided will be continuously described.

The vehicle front outside detection section 21a includes the camera 40, the laser radar 42 and a detection section 36a. Further, while the detection section 36a is included in the vehicle front outside detection section 21a in the embodiment, the detection section 36a may be provided in the lighting control device 30a.

For example, the camera 40 may include a function of detecting visible light, may include a function of detecting infrared light, or may include both of them. In the embodiment, the case in which the camera 40 includes a function of detecting visible light will be continuously described. The camera 40 is installed at a predetermined position of the automobile 1a (for example, in the vicinity of the interior rearview mirror), and captures a space in front of the host vehicle. The camera 40 outputs image information obtained by capturing a space in front of the host vehicle to the acquisition section 34.

The laser radar 42 radiates laser or millimeter waves to a side in front of the automobile 1a and radiates the radiated laser or millimeter waves in a two-dimensional shape, and receives the laser or millimeter waves reflected to the side in front of the automobile 1a. The laser radar 42 outputs the received laser or millimeter waves to the detection section 36a.

The detection section 36a derives a distance between the reference points that is a distance between a reference point K1 of the automobile 1a and a detection reference position of the vehicle 2 located in front on the basis of the laser or millimeter waves output from the laser radar 42. Here, an example of a reference point of the automobile 1a is a position to which the laser radar 42 is attached (for example, in the vicinity of the bumper). The detection section 36a corrects the derived distance between the reference points by adding or subtracting a variation of a distance between the vehicle 2 located in front and the automobile 1a generated during a time until information showing the light shielding range is output from the lighting control device 30a to the headlight section 10 after the laser or millimeter waves are output from the laser radar 42 to the lighting control device 30a to/from the distance, and derives the distance L between the reference points after correction that is the corrected distance between the reference points.

Specifically, when the vehicle 2 located in front is a preceding vehicle that travels at a higher speed than the automobile 1a, the detection section 36a derives the distance L between the reference points after correction by adding a variation of a distance between the vehicle 2 located in front and the automobile 1a to the derived distance between the reference points. In addition, when the vehicle 2 located in front is a preceding vehicle that travels at a lower speed than the automobile 1a and when the vehicle 2 located in front is an oncoming vehicle, the detection section 36a derives the distance L between the reference points after correction by subtracting a variation of a distance between the vehicle 2 located in front and the automobile 1a from the derived distance between the reference points.

Here, a variation of a distance between the vehicle 2 located in front and the automobile 1a is previously derived.

For example, a value of the variation can be obtained by calculating a variation of distances per unit time of the vehicle 2 located in front and the host vehicle 1 from measurement data of distance between vehicles in the past, and multiplying a time consumed for outputting information showing the light shielding range from the image output and the variation value. In addition, if speed information of the vehicle 2 located in front is available through another method (infrared communication or the like), a variation value may be calculated by integrating a speed difference with the host vehicle 1 while the information showing the light shielding range is output from the image output.

The detection section 36a derives the headlight radiation lower angle θ3. The detection section 36a outputs the information showing the derived distance L between the reference points after correction and the information showing the headlight radiation lower angle θ3 to the light distribution controller 38.

The lighting control device 30a includes the storage 32a, the acquisition section 34 and the light distribution controller 38.

The storage 32a stores information. Here, the storage 32a may store arbitrary information. As an example, the storage 32a may store information such as a control program, a control parameter, or the like, executed by the lighting control device 30a. In this case, the lighting control device 30a includes a processor such as a CPU or the like, and the processor executes various types of processing by executing the control program stored in the storage 32a using the control parameter stored in the storage 32a.

(Operation of Lighting System)

FIG. 9 may be applied as a flowchart showing an example of a procedure of processing for controlling a light shielding range of the lighting system 100a provided in the automobile 1a according to the embodiment of the present invention.

However, in step S13, the detection section 36a of the lighting control device 30a derives a distance between the reference points that is a distance between the reference point K1 of the automobile 1a and the detection reference position of the vehicle 2 located in front. The detection section 36a corrects the derived distance between the reference points by adding or subtracting a variation of a distance between the vehicle 2 located in front and the automobile 1a generated during a time until the information showing the light shielding range is output from the lighting control device 30a to the headlight section 10 after the laser or millimeter waves are output from the laser radar 42 to the lighting control device 30a to/from the distance, and derives the distance L between the reference points after correction that is the corrected distance between the reference points.

In addition, the detection section 36a derives the headlight radiation lower angle θ3.

In the above-mentioned second embodiment, while the case in which the automobile 1a includes the left headlight 14L and the right headlight 14R and both of the left headlight 14L and the right headlight 14R perform light shielding control with respect to the upward/downward direction of the vehicle located in front has been described, there is no limitation thereto. For example, either the left headlight 14L or the right headlight 14R may perform the light shielding control with respect to the upward/downward direction of the vehicle located in front.

In the above-mentioned second embodiment, while the case in which the light shielding control of the left headlight 14L and the right headlight 14R of the automobile 1a is performed with respect to the upward/downward direction of the vehicle 2 located in front has been described as an example of the light distribution control, there is no limitation thereto. For example, light shielding control of the left headlight 14L and the right headlight 14R of the automobile 1a may be performed with respect to the leftward/rightward direction in addition to the upward/downward direction of the vehicle 2 located in front.

In the above-mentioned second embodiment, while the case in which the light distribution controller 38 of the lighting control device 30a calculates sin θ3 has been described, there is no limitation thereto. For example, the headlight radiation lower angle θ3 can be approximated as θ3≈sin θ3≈tan θ3 when it is a small angle. In this case, it may be calculated by replacing sin θ3 with θ3.

In the above-mentioned second embodiment, while the case in which the detection section 36a derives a distance between the reference points that is a distance between a reference point of the automobile 1a and a detection reference position of the vehicle 2 located in front on the basis of the image in front of the automobile 1a periodically captured by the camera 40 has been described, there is no limitation thereto. For example, the detection section 36a may derive a distance between a reference point of the automobile 1a and a point at which the line extending from the reference point to be parallel to the ground surface reaches the vehicle 2 located in front on the basis of the image in front of the automobile 1a periodically captured by the camera 40. In this case, the detection section 36a converts the derived distance into a distance between the reference points, and performs the above-mentioned processing on the basis of the result obtained by converting the derived distance into the distance between the reference points.

In the above-mentioned second embodiment, while the case in which the acquisition section 34 detects the vehicle 2 located in front by recognizing the tail light (the left tail light section 11L, the right tail light section 11R) of the preceding vehicle when the vehicle 2 located in front is the preceding vehicle and recognizing the headlamp (the left headlight section 10L, the right headlight section 10R) of the oncoming vehicle when the vehicle 2 located in front is the oncoming vehicle has been described, there is no limitation thereto. For example, the acquisition section 34 may extract structural feature points of the image such as distribution or the like of an edge that are points at which variations of concentrations in the image are abrupt by performing image recognition processing, and may detect the vehicle 2 located in front when the extracted feature point can be determined as feature points of the vehicle.

In the above-mentioned second embodiment, while the case in which the tail light (the left tail light section 11L, the right tail light section 11R) of the preceding vehicle when the vehicle 2 located in front is the preceding vehicle and the headlamp (the left headlight section 10L, the right headlight section 10R) of the oncoming vehicle when the vehicle 2 located in front is the oncoming vehicle are examples of the feature values of the vehicle 2 located in front has been described, there is no limitation thereto. For example, a vehicle height, a vehicle width, color, brightness, or the like, may be used as an example of the feature value of the vehicle 2 located in front.

In the above-mentioned second embodiment, the acquisition section 34 detects the vehicle 2 located in front on the basis of the image in front of the automobile 1a periodically captured by the camera 40 included in the vehicle front outside detection section 21, and derives vehicle model information on the basis of the detected feature values of the vehicle 2 located in front. Then, while the case in which the light distribution controller 38 derives a light shielding condition on the basis of the vehicle model information derived by the acquisition section 34 and controls light distribution on the basis of the derived light shielding condition has been described, there is no limitation thereto.

For this reason, the acquisition section 34 already tracks the vehicle 2 located in front that is a target of the light distribution control when the light distribution controller 38 performs the light distribution control. During the tracking, the vehicle model condition (the vehicle height H1, the detection reference height H2, or the Z coordinate (Z1) of the lower limit position LPC of the vehicle located in front and the Z coordinate (Z2) of the upper limit position UPC of the vehicle located in front of the light radiated from the left headlight 14L and the right headlight 14R) is not varied.

Since only the distance varies as time elapses, when the distance information is continuously available and the tracking is continued, the light shielding range can be varied according to Equation (1) to Equation (6). For example, even in a situation in which the feature value cannot be detected during tracking, for example, in a situation in which one of the left tail light section 11L and the right tail light section 11R (the left and right tail lights) is hidden by a shielding object, the light shielding range according to the variation in distance can be set. Then, when the vehicle model information of the vehicle located in front detected by the acquisition section 34 is varied from the vehicle located in front that is an object of the tracking, the light distribution controller 38 may change the light shielding condition on the basis of the varied vehicle model information of the vehicle located in front.

In the above-mentioned second embodiment, while the case in which the lighting control device 30a performs the light shielding control with respect to the upward/downward direction of the vehicle 2 located in front when the vehicle located in front is detected on the basis of the information related to an outer side of a front side of the automobile 1a has been described, there is no limitation thereto. For example, when following vehicle is detected on the basis of the information related to an outer side of a rear side of the automobile 1a, the light shielding control may be performed with respect to the upward/downward direction of the following vehicle. In this case, light shielding control is performed with respect to the upward/downward direction of the following vehicle when the following vehicle is detected on the basis of the information related to an outer side of a rear side of the automobile 1a detected by the vehicle rear outside detection section.

In addition, when a lateral vehicle is detected on the basis of the information related to a lateral side on a side of the automobile 1a, light shielding control may be performed with respect to the upward/downward direction of the lateral vehicle. In this case, the lateral vehicle is detected on the basis of the information related to a lateral outer side of the automobile 1a detected by the vehicle lateral outside detection section, light shielding control is performed with respect to the upward/downward direction of the lateral vehicle.

In the above-mentioned second embodiment, while the case in which the vehicle front outside detection section 21a includes the camera 40 and the laser radar 42 has been described as an example, there is no limitation thereto. For example, one or more of radar, sonar, and so on, may be further provided in addition to the camera 40 and the laser radar 42.

In the above-mentioned second embodiment, while the case in which the uppermost section of the bumper of the vehicle 2 located in front is provided as an example of the detection reference position has been described, there is no limitation thereto. For example, the detection reference position may be the lowermost section of the rear window of the vehicle 2 located in front or may be a central section of the bumper of the vehicle 2 located in front. In addition, the detection reference position may be different according to the vehicle type information.

In the above-mentioned second embodiment, an arbitrary method may be used for derivation of the headlight radiation lower angle θ3. Specifically, the detection section 36a may derive the headlight radiation lower angle θ3 using an association table that is previously stored in the image information of the camera. In addition, the detection section 36a may calculate the distance L between the reference points after correction in advance, and derive the headlight radiation lower angle θ3 on the basis of the calculated distance L between the reference points after correction, the height of the reference point K1 of the automobile 1a and the detection reference height H2. In this case, the detection section 36a derives the headlight radiation lower angle θ3 by calculating arc sin (a height of the reference point K1 of the automobile 1−H2)/L. In addition, when the detection section 36a has a device having an angle measurement function such as laser radar or the like, the detection section 36 may derive the headlight radiation lower angle θ3 using a result obtained through measurement by the device having the angle measurement function.

According to the lighting control device 30a of the second embodiment, the lighting control device 30 acquires vehicle model information of the vehicle 2 located in front and the automobile 1a, detects a distance between the vehicle 2 located in front and the automobile 1a, and controls light distribution with respect to the vehicle 2 located in front on the basis of the vehicle model information and the distance. According to the above-mentioned configuration, the lighting control device 30a can derive the light distribution condition of the vehicle 2 located in front in the upward/downward direction on the basis of the vehicle model information of the vehicle 2 located in front and the automobile 1a and the distance between the vehicle 2 located in front and the automobile 1a, and it is possible to control a light distribution pattern of the headlamp of the automobile 1 with respect to the vehicle 2 located in front. Accordingly, in the lighting system 100a in which light distribution is divided in the upward/downward direction, it is possible to provide a comfortable view to a driver in the automobile 1a without giving glare to the vehicle 2 located in front.

Further, since the laser radar 42 radiates light to a side in front of the automobile 1a and the distance L between the reference points after correction is derived using laser or millimeter waves reflected to the side in front of the automobile 1a, the distance L between the reference points after correction can be derived in a short period and at substantially closer to actual real time compared to deriving the distance L between the reference points after correction on the basis of the image in front of the automobile 1a periodically captured by the camera 40.

Configuration Example

As a configuration example, there is provided a lighting control device (in the embodiment, the lighting control device 30a) configured to control a radiation state of light by a headlamp for a vehicle (in the embodiment, the headlight section 10), the lighting control device including a vehicle model information acquisition section (in the embodiment, the acquisition section 34) configured to acquire vehicle model information of a vehicle located in front in front of a host vehicle, a distance detection section (in the embodiment, the detection section 36a) configured to detect a distance between the vehicle located in front and the host vehicle, and a light distribution controller (in the embodiment, the light distribution controller 38) configured to control a light distribution with respect to a side in front of the host vehicle by the headlamp for a vehicle on the basis of the vehicle model information and the distance.

As a configuration example, the light distribution controller controls a light shielding range with respect to the vehicle located in front by controlling the light distribution with respect to a front side.

As a configuration example, the light distribution controller controls a light shielding range of the headlamp of the host vehicle with respect to the upward/downward direction of the vehicle located in front.

As a configuration example, the distance detection section periodically detects a distance between the front side and the host vehicle, and the light distribution controller controls a light distribution with respect to the vehicle located in front on the basis of the vehicle model information and the distance that is periodically detected.

A program configured to realize a function of a device according to the above-mentioned embodiment (for example, the lighting control device 30, 30a, or the like) may be recorded on a computer-readable recording medium, and the program recorded on the recording medium may be read and executed in a computer system to perform processing.

Further, "the computer system" disclosed herein may include an operating system (OS) or hardware such as peripheral devices or the like.

In addition, "the computer-readable recording medium" is referred to as a storage device such as a flexible disk, an opto-magnetic disk, a read only memory (ROM), a non-volatile memory that is writable such as a flash memory, a portable medium such as a digital versatile disk (DVD) or the like, a hard disk installed in a computer system, or the like.

Further, "the computer-readable recording medium" may include a medium that holds a program for a constant time such as a volatile memory (for example, a dynamic random access memory (DRAM)) in a computer system that is a server or a client when a program is transmitted via a network such as the Internet or the like, or a communication line such as a telephone line or the like.

In addition, the program may be transmitted from the computer system in which the program is stored in a storage device or the like to another computer system as a transmitted wave in a transmission medium via the transmission medium. Here, the "transmission medium" that transmits the program is referred to as a medium having a function of transmitting information such as a network such as the Internet (a communication network) or a communication line such as a telephone line or the like (a communication wire).

In addition, the program may be provided to realize a part of the above-mentioned function. Further, the program may be a so-called differential file (different program) that can be combined with the program in which the above-mentioned function is already recorded in the computer system and realized.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A lighting control device configured to control a radiation state of light by a headlamp for a vehicle, the lighting control device comprising:
    a vehicle model information acquisition section configured to acquire vehicle model information of a vehicle located in front of a host vehicle;
    a distance detection section configured to detect a distance between the vehicle located in front and the host vehicle; and
    a light distribution controller configured to control a light distribution with respect to a side in front of the host vehicle by the headlamp for a vehicle on the basis of the vehicle model information and the distance,
    wherein the light distribution controller is configured to control a light shielding range with respect to the vehicle located in front by controlling the light distribution with respect to the front side, and
    wherein the light distribution controller is configured to control a light shielding range of the headlamp of the host vehicle with respect to an upward/downward direction of the vehicle located in front.

2. A lighting tool for a vehicle comprising:
    a headlamp for a vehicle; and
    the lighting control device according to claim 1.

3. The lighting control device according to claim 1,
    wherein, as for the vehicle model information, the vehicle model information acquisition section acquires information showing a vehicle height of the vehicle located in front of the host vehicle and information showing the detection reference height which is a detection reference position for detecting the vehicle located in front of the host vehicle,
    as for the distance, the distance detection section derives a distance between reference points that is a distance between a reference point of the host vehicle and the detection reference position of the vehicle located in front of the host vehicle,
    the distance detection section derives a headlight radiation lower angle which is an angle formed by a line obtained by horizontally extending the reference point of the host vehicle with respect to a ground surface and a line that connects the reference point of the host vehicle and the detection reference position of the vehicle located in front of the host vehicle, and
    the light distribution controller controls the light shielding range of the headlamp of the host vehicle with respect to the upward/downward direction of the vehicle located in front of the host vehicle based on the information showing the vehicle height of the vehicle located in front of the host vehicle, information showing the detection reference height, the distance between the reference points and the headlight radiation lower angle.

4. The lighting control device according to claim 1, wherein the distance detection section periodically detects a distance between the vehicle located in front and the host vehicle, and
    the light distribution controller controls the light distribution with respect to the front side on the basis of the vehicle model information and the distance that is periodically detected.

5. The lighting control device according to claim 3, further comprising a vehicle front outside detection device that includes one or more of a camera, a light detection and ranging (LiDAR), radar and sonar that are configured to detect information related to a front outside of the host vehicle.

6. A lighting system comprising:
    the lighting tool and headlamp for a vehicle according to claim 2, and
    a vehicle front outside detection device,
    wherein the vehicle front outside detection device includes one or more of a camera, a light detection and ranging (LiDAR), radar and sonar that are configured to detect information related to a front outside of the host vehicle,
    the vehicle front outside detection device is configured to output information related to the vehicle located in front of the host vehicle to the lighting control device, and
    the vehicle model information acquisition section derives information showing a vehicle height of the vehicle located in front of the host vehicle based on the output information from the vehicle front outside detection device.

7. The lighting system according to claim 6, wherein the distance detection section derives a distance between the vehicle located in front of the host vehicle and the host vehicle based on the output information from the vehicle front outside detection device.

8. The lighting system according to claim 6, wherein the distance detection section periodically detects a distance between the vehicle located in front and the host vehicle, and
    the light distribution controller controls the light distribution with respect to the front side on the basis of the vehicle model information and the distance that is periodically detected.

9. The lighting system according to claim 8, wherein the distance detection section derives the distance between the vehicle located in front of the host vehicle and the host vehicle by correcting the distance according to a variation of the distance between the vehicle located in front of the host vehicle and the host vehicle generated in a time while information showing a light shielding range is output from the lighting control device to the headlamp.

10. The lighting system according to claim 6, wherein the vehicle model information acquisition section is configured to derive information including size categories of the vehicle located in front of the host vehicle.

11. The lighting system according to claim 6, wherein the lighting control device includes a computer system, and
    at least one of the distance detected by the distance detection section and the vehicle height acquired by the vehicle model information acquisition section is calculated by executing a program recorded on a computer-readable recording medium.

12. The lighting system according to claim 11, wherein the distance detection section derives a distance between the vehicle located in front of the host vehicle and the host vehicle based on the output information from the vehicle front outside detection device.

13. The lighting system according to claim 11, wherein the distance detection section periodically detects the distance between the vehicle located in front of the host vehicle and the host vehicle, and
the light distribution controller controls the light distribution with respect to the front side on the basis of the vehicle model information and the distance that is periodically detected.

14. The lighting system according to claim 13, wherein the distance detection section derives the distance between the vehicle located in front of the host vehicle and the host vehicle by correcting the distance according to a variation of the distance between the vehicle located in front of the host vehicle and the host vehicle generated in a time while information showing a light shielding range is output from the lighting control device to the headlamp.

15. The lighting system according to claim 11,
wherein, as for the vehicle model information, the vehicle model information acquisition section acquires information showing a vehicle height of the vehicle located in front of the host vehicle and information showing the detection reference height which is a detection reference position for detecting the vehicle located in front of the host vehicle,
as for the distance, the distance detection section derives a distance between reference points that is a distance between a reference point of the host vehicle and the detection reference position of the vehicle located in front of the host vehicle,
the distance detection section derives a headlight radiation lower angle which is an angle formed by a line obtained by horizontally extending the reference point of the host vehicle with respect to a ground surface and a line that connects the reference point of the host vehicle and the detection reference position of the vehicle located in front of the host vehicle, and
the light distribution controller controls the light shielding range of the headlamp of the host vehicle with respect to the upward/downward direction of the vehicle located in front of the host vehicle based on the information showing the vehicle height of the vehicle located in front of the host vehicle, information showing the detection reference height, the distance between the reference points and the headlight radiation lower angle.

16. A lighting control method executed by a lighting control device configured to control a radiation state of light from a headlamp for a vehicle, the method comprising:
acquiring vehicle model information of a vehicle located in front of a host vehicle;
detecting a distance between the vehicle located in front and the host vehicle; and
controlling a light shielding range of the headlamp of the host vehicle with respect to an upward/downward direction of the vehicle located in front by controlling a light distribution with respect to a side in front of the host vehicle by the headlamp for a vehicle on the basis of the vehicle model information and the distance.

17. The lighting control method according to claim 16,
as for the vehicle model information, acquiring information showing a vehicle height of the vehicle located in front of the host vehicle and information showing the detection reference height which is a detection reference position for detecting the vehicle located in front of the host vehicle,
as for the distance, deriving a distance between reference points that is a distance between a reference point of the host vehicle and the detection reference position of the vehicle located in front of the host vehicle,
deriving a headlight radiation lower angle which is an angle formed by a line obtained by horizontally extending the reference point of the host vehicle with respect to a ground surface and a line that connects the reference point of the host vehicle and the detection reference position of the vehicle located in front of the host vehicle, and
controlling the light shielding range of the headlamp of the host vehicle with respect to an upward/downward direction of the vehicle located in front of the host vehicle based on the information showing a vehicle height of the vehicle located in front of the host vehicle, information showing the detection reference height, the distance between the reference points and the headlight radiation lower angle.

18. The lighting control method according to claim 17, detecting information related to a front outside of the host vehicle with one or more of a camera, a light detection and ranging (LiDAR), radar and sonar.

* * * * *